United States Patent
Xu (10) Patent No.: US 11,753,221 B2
(45) Date of Patent: Sep. 12, 2023

(54) CONNECTED TIE STRAP AND LOCKING DEVICE

(71) Applicant: SHENZHEN SWIFT AUTOMATION TECHNOLOGY CO., LTD., Shenzhen (CN)

(72) Inventor: Xiuyi Xu, Shenzhen (CN)

(73) Assignee: SHENZHEN SWIFT AUTOMATION TECHNOLOGY CO., LTD., Shenzhen (CN)

( * ) Notice: Subject to any disclaimer, the term of this patent is extended or adjusted under 35 U.S.C. 154(b) by 242 days.

(21) Appl. No.: 16/960,784

(22) PCT Filed: Jun. 1, 2018

(86) PCT No.: PCT/CN2018/089658
§ 371 (c)(1),
(2) Date: Jul. 8, 2020

(87) PCT Pub. No.: WO2019/136913
PCT Pub. Date: Jul. 18, 2019

(65) Prior Publication Data
US 2020/0339329 A1  Oct. 29, 2020

(30) Foreign Application Priority Data

Jan. 12, 2018  (CN) .......................... 201810030813.3

(51) Int. Cl.
*B65D 85/24*   (2006.01)
*B65D 63/10*   (2006.01)
(Continued)

(52) U.S. Cl.
CPC ........ *B65D 63/1027* (2013.01); *B65B 13/027* (2013.01); *B65D 85/24* (2013.01);
(Continued)

(58) Field of Classification Search
CPC .............. B65D 85/24; B65D 2563/108; B65D 63/1027; B65D 2563/103; B65D 2563/107
(Continued)

(56) References Cited

U.S. PATENT DOCUMENTS 2,811,702 A * 10/1957 Narozny .............. H01R 12/585
206/820
4,632,247 A * 12/1986 Moody ................. B65B 13/027
206/820
(Continued)

FOREIGN PATENT DOCUMENTS

CN         1114548 C      7/2003
CN      107128596 B1     9/2017
(Continued)

OTHER PUBLICATIONS

International Search Report for International Application No. PCT/CN2018/089658, dated Oct. 24, 2018.
(Continued)

*Primary Examiner* — Jacob K Ackun
(74) *Attorney, Agent, or Firm* — Dinsmore & Shohl LLP (57) ABSTRACT

A connected tie strap, including: integrated fixing tie straps or labeled tie straps, and main rib boards, wherein the main rib boards are perpendicular to the length direction of the integrated fixing tie straps or the labeled tie straps; a shunt is disposed between the fixed heads of the integrated fixing tie straps or labels of the labeled tie straps and the main rib boards; also included is an auxiliary rib board, wherein the auxiliary rib is perpendicular to the length direction of the integrated fixing tie straps or the labeled tie straps; the main rib boards and/or the auxiliary rib is further provided thereon with interval positioning holes or interval positioning post, two ends of the main rib boards and/or the auxiliary rib also (Continued)

being respectively provided with positioning holes and/or positioning posts.

17 Claims, 11 Drawing Sheets

(51) Int. Cl.
    *B65B 13/02*     (2006.01)
    *F16B 15/08*     (2006.01)

(52) U.S. Cl.
    CPC ........ *F16B 15/08* (2013.01); *B65D 2563/103* (2013.01); *B65D 2563/107* (2013.01); *B65D 2563/108* (2013.01)

(58) Field of Classification Search
    USPC .................................. 206/338, 343, 345, 346
    See application file for complete search history.

(56) References Cited

U.S. PATENT DOCUMENTS

| | | | | | |
|---|---|---|---|---|---|
| 4,640,320 | A | * | 2/1987 | Avison | B65D 63/1063 |
| | | | | | 206/820 |
| 4,851,964 | A | * | 7/1989 | Endo | H05K 3/0052 |
| | | | | | 374/208 |
| 5,042,535 | A | * | 8/1991 | Schlottke | B65B 13/027 |
| | | | | | 206/820 |
| 5,595,220 | A | * | 1/1997 | Leban | B65B 13/027 |
| | | | | | 140/93.2 |
| 5,967,316 | A | * | 10/1999 | Abbruzzese | F16L 3/137 |
| | | | | | 206/820 |
| 6,220,434 | B1 | * | 4/2001 | Kubota | B65D 63/1081 |
| | | | | | 24/711.1 |
| 6,446,311 | B1 | * | 9/2002 | Ueno | G09F 3/14 |
| | | | | | 24/17 AP |
| 6,467,650 | B1 | * | 10/2002 | Lesser | H02G 3/26 |
| | | | | | 221/208 |
| 6,533,155 | B1 | * | 3/2003 | Kubota | B65C 7/005 |
| | | | | | 227/67 |
| 2011/0143074 | A1 | * | 6/2011 | Harsley | B29C 45/0055 |
| | | | | | 264/297.2 |
| 2011/0162171 | A1 | * | 7/2011 | Gmeilbauer | F16B 5/065 |
| | | | | | 24/16 R |
| 2019/0061370 | A1 | * | 2/2019 | Haase | B41J 3/407 |

FOREIGN PATENT DOCUMENTS

| | | |
|---|---|---|
| EP | 0073633 A1 | 3/1983 |
| EP | 0264142 A2 | 4/1988 |
| JP | 05162910 A | 6/1993 |

OTHER PUBLICATIONS

Office Action from corresponding Brazilian Patent Application No. 112020013914-9, dated Jul. 21, 2022, 6 pages.
Office Action from corresponding Japanese Patent Application No. 2020-0536750, dated Jun. 1, 2021, 6 pages.
Office Action from corresponding Korean Patent Application No. 10-2020-7018106, dated Jan. 13, 2022, 13 pages.
Office Action from corresponding European Patent Application No. 18899286.1, dated Apr. 1, 2021, 4 pages.
Office Action from corresponding Brazilian Patent Application No. 112020013914-9, dated Mar. 9, 2023, 8 pages.
Office Action from corresponding Japanese Patent Application No. 2020-0536750, dated Feb. 8, 2022, 4 pages.
Office Action from corresponding Korean Patent Application No. 10-2020-7018106, dated Apr. 19, 2022, 6 pages.
Office Action from corresponding European Patent Application No. 18899286.1, dated Nov. 16, 2021, 3 pages.
Decision to Grant corresponding Japanese Patent Application No. 2020-536750, dated May 17, 2022, 5 pages.
Decision to Grant corresponding Korean Patent Application No. 10-2020-7018106, dated Jul. 5, 2022, 3 pages.
Written Opinion of corresponding International Patent Application No. PCT/CN2018/089658, dated Oct. 24, 2018, 3 pages.
European Search Report of corresponding European Patent Application No. EP18899286.1, dated Dec. 2, 2021, 4 pages.

* cited by examiner

CONNECTED TIE STRAP AND LOCKING DEVICE

CROSS-REFERENCE TO RELATED APPLICATIONS

The present disclosure is a U.S. National Phase of International Application No. PCT/CN2018/089658, filed Jun. 1, 2018 and entitled "CONNECTED TIE STRAP AND LOCKING DEVICE", which claims priority to Chinese Patent Application No. 2018100308133, filed with the Chinese Patent Office on Jan. 12, 2018, and entitled "Connected Tie Strap", each of which is incorporated herein by reference in its entirety.

TECHNICAL FIELD

The present disclosure relates to a tie, and in particular to an interconnected tie assembly (or a connected tie strap) and a locking device.

BACKGROUND ART

Conventional nylon ties (cable ties) have relatively square-shaped heads, by which it is easier to achieve automatic bundling. Automatic bundling apparatuses are commercially available in which loose-packed conventional nylon ties are used and the ties are fed by using a vibratory bowl feeder. The conventional nylon ties are interconnected in order to facilitate the automatic sorting of the ties. The automatic bundling apparatus becomes much simpler when the interconnected ties are used. Therefore, hand-held automatic tying tools using interconnected conventional nylon ties have appeared. However, one-piece fixing ties are widely used in cars, trains, motorbikes, and household appliances. The one-piece fixing tie is a combination of a conventional tie function and an additional fixing head feature (e.g., an elastic fastener). Objects to be bundled are bundled with a one-piece fixing tie and then fastened directly onto a sheet metal part by using the elastic fastener of the one-piece fixing tie. Common types of the head features of the one-piece fixing ties mainly include: a combined type of a fir-tree-shaped head plus a disc or a fir-tree-shaped head plus wings, a combined type of an arrow head plus a disc or an arrow head plus wings, a flat-plate type with a locking hole, and so on. The one-piece fixing ties for both cars and household appliances are injection-molded by using plastic molds and are manually pulled out from flow channels for injection molding one by one and then put into plastic bags, and then, when in use, taken out from the plastic packaging bags one by one, and manually and individually applied to bundles. There is also a labelled tie (i.e., a tie with a label or tag), with a flat plate attached to the head of the tie as a label, on which a text or pattern is printed or a two-dimensional barcode is engraved, as widely used in industry and agriculture for tracing the origin of products and in logistics, postal service, and other industries. We have designed, for short-sized one-piece fixing ties, a desktop-type automatic bundling apparatus into which ties are fed by using a vibratory bowl feeder, but the automatic bundling apparatus into which one-piece fixing ties are fed by using a vibratory bowl feeder has poor reliability due to inevitable deformation of the loose-packed one-piece fixing ties, and the desktop-type design into which ties are fed by using a vibratory bowl feeder is only applicable in a narrow range. Since the one-piece fixing ties and the labelled ties have irregularly-shaped heads, any automatic tool applicable to the one-piece fixing ties or to the labelled ties has not been available in the world so far, and interconnected one-piece fixing ties and interconnected labelled ties have also not appeared. The inventor has designed the one-piece fixing ties or the labelled ties as an interconnected tie assembly in order to enable automatic bundling operations with the one-piece fixing ties or the labelled ties.

SUMMARY

The object of the present disclosure includes providing an interconnected tie assembly designed to solve the deficiencies of the traditional loose-packed one-piece fixing ties and labelled ties which are less adaptable to automatic bundling operations.

The present disclosure is implemented by the following technical solution: an interconnected tie assembly, comprising a main reinforcing plate, and one-piece fixing ties or labelled ties, wherein the one-piece fixing ties or the labelled ties are arranged at a fixed interval, the main reinforcing plate is perpendicular to a length direction of each of the one-piece fixing ties or the labelled ties, and a fixing head portion of at least one of the one-piece fixing ties or a label edge of at least one of the labelled ties is connected integrally with one main reinforcing plate to form a unit of interconnected ties.

Optionally, there are a plurality of one-piece fixing ties or labelled ties, and the fixing head portions of the plurality of one-piece fixing ties or the label edges of the plurality of labelled ties are connected directly to one main reinforcing plate, respectively.

Optionally, a runner is disposed between the head of each of the one-piece fixing ties or labelled ties and the main reinforcing plate.

Optionally, positioning members are provided at the two ends of the main reinforcing plate, respectively.

Optionally, the positioning member includes a positioning hole and/or a positioning column, and the positioning hole and/or the positioning column is in a circular, elliptical, or polygonal shape; or the positioning member includes a positioning rib and/or a positioning slot.

Optionally, the positioning member includes a positioning hole and a positioning column, wherein the positioning hole and the positioning column are provided at the two ends of the main reinforcing plate, respectively, and the positioning hole and the positioning column can be connected to each other in cooperation; or the positioning member includes a positioning rib and a positioning slot, wherein the positioning rib and the positioning slot are provided at the two ends of the main reinforcing plate, respectively, and the positioning rib and the positioning slot can be connected to each other in cooperation.

Optionally, the main reinforcing plate is provided with interval positioning holes or interval positioning columns, and a distance between two adjacent interval positioning holes or interval positioning columns is equal to the interval between two adjacent one-piece fixing ties or labelled ties in the unit of interconnected ties; or the distance between two adjacent interval positioning holes or interval positioning columns is equal to n times or 1/n times the interval between two adjacent one-piece fixing ties or labelled ties in the unit of interconnected ties, wherein n is a positive integer.

Optionally, the interval positioning holes or interval positioning columns are each in a circular, elliptical, or polygonal shape.

Optionally, the interconnected tie assembly further comprises an auxiliary reinforcing plate, the auxiliary reinforcing plate is perpendicular to the length direction of each of the one-piece fixing ties or labelled ties, and the auxiliary reinforcing plate is connected to an end portion of each of the one-piece fixing ties or labelled ties.

Optionally, positioning members are provided at the two ends of the auxiliary reinforcing plate, respectively.

Optionally, the positioning member includes a positioning hole and/or a positioning column, and the positioning hole and/or the positioning column is in a circular, elliptical, or polygonal shape.

Optionally, the positioning member includes a positioning hole and a positioning column, wherein the positioning hole and the positioning column are provided at the two ends of the auxiliary reinforcing plate, respectively, and the positioning hole and the positioning column can be connected to each other in cooperation.

Optionally, the auxiliary reinforcing plate is provided with interval positioning holes or interval positioning columns, and a distance between two adjacent interval positioning holes or interval positioning columns is equal to the interval between two adjacent one-piece fixing ties or labelled ties in the unit of interconnected ties, or the distance between two adjacent interval positioning holes or interval positioning columns is equal to n times or 1/n times the interval between two adjacent one-piece fixing ties or labelled ties in the unit of interconnected ties, wherein n is a positive integer.

Optionally, the interval positioning holes or interval positioning columns on the auxiliary reinforcing plate are each in a circular, elliptical, or polygonal shape.

Optionally, a plurality of units of interconnected ties are connected in an end-to-end manner to form a string or a roll.

A further object of the present disclosure is to provide a locking device, comprising the interconnected tie assembly described in the present disclosure.

The present disclosure has at least the following advantageous effects:

1. Compared with loose-packed one-piece fixing ties or labelled ties, the interconnected one-piece fixing ties or labelled ties are much less deformable, which provides a more reliable feeding mode for automatic tying operations.

2. The interconnected one-piece fixing ties or labelled ties are fed without a vibratory bowl feeder and a material dispersing mechanism, so that an apparatus for automatic tying operation can be changed from the automatic tying apparatus to an automatic tying tool, and the apparatus can be made with a greatly reduced cost and size, and used more conveniently.

3. The combination of the arrangement of the structure of the interconnected one-piece fixing ties or labelled ties with the injection molding process and injection mold technology not only reduces the amount of waste materials in the flow channels, but also reduces the workload because it is unnecessary to manually pull out the ties one by one from the flow channels for injection molding after the ties are molded.

4. Traditionally, after the injection molding, the loose-packed one-piece fixing ties or the loose-packed labelled ties, which are pulled out one by one and then put into bags, are deformed while being pulled out, and have an increased chance of deformation when they are put into plastic bags in a loose-packed state, while the interconnected one-piece fixing ties or labelled ties are much less deformed because they are present in an interconnected mode from the aspects including the mold structure, manufacturing process, packaging, and sale.

Reference Numerals: 1-one-piece fixing tie; 2-main reinforcing plate; 3-runner; 4-positioning hole; 5-positioning column; 6-auxiliary reinforcing plate; 7-interval positioning hole or interval positioning column; 8-labelled tie.

DETAILED DESCRIPTION OF EMBODIMENTS

In order to further clarify the objects, technical solutions, and advantages of the embodiments of the present disclosure, the technical solutions of the embodiments of the present disclosure will be described below clearly and completely with reference to the drawings of the embodiments of the present disclosure. It is apparent that the embodiments to be described are some, but not all of the embodiments of the present disclosure. All the other embodiments obtained by those of ordinary skill in the art in light of the embodiments of the present disclosure without inventive efforts will fall within the scope of the present disclosure as claimed. Thus, the following detailed description of the embodiments of the present disclosure, as represented in the drawings, is not intended to limit the scope of the present disclosure as claimed, but is merely representative of selected embodiments of the present disclosure. All the other embodiments obtained by those of ordinary skill in the art in light of the embodiments of the present disclosure without inventive efforts will fall within the scope of the present disclosure as claimed.

In the description of the present disclosure, it should be understood that orientation or positional relationships indicated by the terms such as "center", "longitudinal", "transverse", "length", "width", "thickness", "up", "down", "front", "rear", "left", "right", "vertical", "horizontal", "top", "bottom", "inside", "outside", "clockwise", and "anticlockwise" are the orientation or positional relationships shown based on the drawings, and these terms are intended only to facilitate the description of the present disclosure and simplify the description, but not intended to indicate or imply that the referred devices or elements must be in a particular orientation, or constructed or operated in the particular orientation, and therefore should not be construed as limiting the present disclosure.

In addition, the terms "first" and "second" are used for descriptive purposes only, and should not be understood as an indication or implication of relative importance or an implicit indication of the number of the indicated technical features. Therefore, a feature defined with the terms "first" and "second" may explicitly or implicitly include one or more such features. In the description of the present disclosure, "a plurality of" means two or more, unless otherwise expressly and specifically defined.

In the present disclosure, the terms "mounted", "coupled", "connected", "fixed", and the like should be understood broadly unless otherwise expressly specified or defined. For example, connection may be fixed connection or detachable connection or integral connection, may be mechanical connection or electric connection, or may be direct coupling or indirect coupling via an intermediate medium or internal communication between two elements or mutual interaction between two elements. The specific meanings of the above-mentioned terms in the present disclosure can be understood by those of ordinary skill in the art according to specific situations.

In the present disclosure, unless otherwise expressly specified or defined, a first feature "on" (or above) or "below" a second feature may include a case where the first and second features are in direct contact, and may also include a case where the first and second features are not in direct contact, but are in contact via an additional feature therebetween. Moreover, a first feature "on", "above", or "over" a second feature is meant to include a case where the first feature is directly above or obliquely above the second feature, or merely means that the first feature is at a level height higher than the second feature. A first feature "below", "under", or "underneath" a second feature is meant to include a case where the first feature is directly below or obliquely below the second feature, or merely means that the first feature is at a level height lower than the second feature.

The present disclosure will be further described below with reference to the drawings and specific embodiments.

An embodiment of the present disclosure provides an interconnected tie assembly, comprising a main reinforcing plate 2, and one-piece fixing ties 1 or labelled ties 8, wherein the one-piece fixing ties 1 or the labelled ties 8 are arranged at a fixed interval, the main reinforcing plate 2 is perpendicular to the length direction of each of the one-piece fixing ties 1 or the labelled ties 8, and a fixing head portion of at least one of the one-piece fixing ties 1 or a label edge of at least one of the labelled ties 8 is connected integrally with one main reinforcing plate 2 to form a unit of interconnected ties.

Here, the main reinforcing plate 2 extends in a direction perpendicular to the length direction of the one-piece fixing tie 1 or labelled tie 8. One or a plurality of one-piece fixing ties 1 or labelled ties 8 may be provided, and one main reinforcing plate 2 is provided. A fixing head portion of at least one one-piece fixing tie 1 or a label edge of at least one labelled tie 8 is fixedly connected to one main reinforcing plate 2 to form a unit of interconnected ties. The fixing head portion of the fixing tie or the label edge of at least one labelled tie 8 may be connected to the main reinforcing plate 2 by means of adhesion, or in any suitable form such as an integrally molded structure.

Since the fixing head portion of at least one one-piece fixing tie 1 or the label edge of at least one labelled tie 8 is fixedly connected to one main reinforcing plate 2, deformation of the fixing head portion of the one-piece fixing tie 1 or of the label edge of the labelled tie 8 can be reduced, which provides a more reliable feeding mode for automatic tying operations.

Moreover, since the fixing head portion of at least one one-piece fixing tie 1 or the label edge of at least one labelled tie 8 is connected integrally with one main reinforcing plate 2 to form a unit of interconnected ties, the interconnected tie assembly according to this embodiment is used without a vibratory bowl feeder and a material dispersing mechanism, so that an apparatus for automatic tying operation can be changed from the automatic tying apparatus to an automatic tying tool, and the apparatus can be made with a greatly reduced cost and size, and used more conveniently.

In addition, compared with the prior art in which the loose-packed one-piece fixing ties 1 or the loose-packed labelled ties 8, which are injection-molded and then are pulled out one by one and then put into bags, are deformed while being pulled out, and have an increased chance of deformation when they are put into plastic bags in a loose-packed state, the interconnected one-piece fixing ties 1 or labelled ties 8 are much less deformed because they are present in an interconnected mode from the aspects including the mold structure, manufacturing process, packaging, and sale.

It should be noted that the one-piece fixing tie 1 may consist of a tie body and a fixing head, wherein one end of the tie body is fixedly connected to the fixing head, the fixing head can secure the tie body, and the fixing head is the fixing head portion described above. The one-piece fixing tie 1 may also consist of a tie body and a fastener, wherein one end of the tie body is fixedly connected to the fastener, the fastener can secure the tie body, and the fastener is the fixing head portion described above.

Optionally, there are a plurality of one-piece fixing ties 1 or labelled ties 8, and the fixing head portions of the plurality of one-piece fixing ties 1 or the label edges of the plurality of labelled ties 8 are connected to one main reinforcing plates 2, respectively.

Specifically, the fixing head portions of the plurality of one-piece fixing ties 1 or the label edges of the plurality of labelled ties 8 are fixedly connected to one main reinforcing plate 2, respectively, and the fixing head portions of the plurality of one-piece fixing ties 1 or the label edges of the plurality of labelled ties 8 are disposed at uniform intervals along the direction of extension of the main reinforcing plate 2 so that the one-piece fixing ties 1 or the labelled ties 8 are arranged at a fixed interval.

As an optional embodiment, as shown in FIGS. 1, 2, 3, and 4, the interconnected tie assembly comprises: a plurality of one-piece fixing ties 1 or labelled ties 8 and one main reinforcing plate 2, wherein the one-piece fixing ties 1 or labelled ties 8 are arranged at a fixed interval, the main reinforcing plate 2 is perpendicular to the length direction of each of the one-piece fixing ties 1 or labelled ties 8, and fixing heads of the plurality of one-piece fixing ties 1 or label edges of the plurality of labelled ties 8 are connected to the main reinforcing plate 2 to form a unit of interconnected ties. The number of the one-piece fixing ties 1 or labelled ties 8 in a unit of interconnected one-piece fixing ties 1 depends on the size(s) of the injection mold and/or the injection molding machine, but the unit of interconnected ties at least contains one one-piece fixing tie 1 or labelled tie 8 and one main reinforcing plate 2. When the unit of interconnected ties is to be used in cooperation with an automatic tying apparatus or an automatic tying tool, the automatic tying apparatus or the automatic tying tool cuts off the one-piece fixing ties 1 or the labelled ties 8 individually and discharges the main reinforcing plate 2 as waste.

Optionally, a runner 3 is disposed between the head of each of the one-piece fixing ties 1 or labelled ties 8 and the main reinforcing plate 2. Specifically, the runner 3 extends in a direction parallel to the length direction of the one-piece fixing tie 1 or labelled tie 8, and the runner 3 has one end fixedly connected to the main reinforcing plate 2, and the other end fixedly connected to the head of the one-piece fixing tie 1 or the labelled tie 8, either by means of adhesion or by a connector. The main reinforcing plate 2, the runners 3, and the one-piece fixing ties 1 or labelled ties 8 may also be made as a one-piece structure.

Optionally, flow channels are provided in the main reinforcing plate 2 and in the runners 3, respectively, and the flow channels of the runners 3 communicate with the flow channels of the main reinforcing plate 2. Therefore, the flow channels in the main reinforcing plate 2 and in the runners 3 are used as flow channels for injection molding of the one-piece fixing ties 1 or labelled ties 8.

Figure 1:
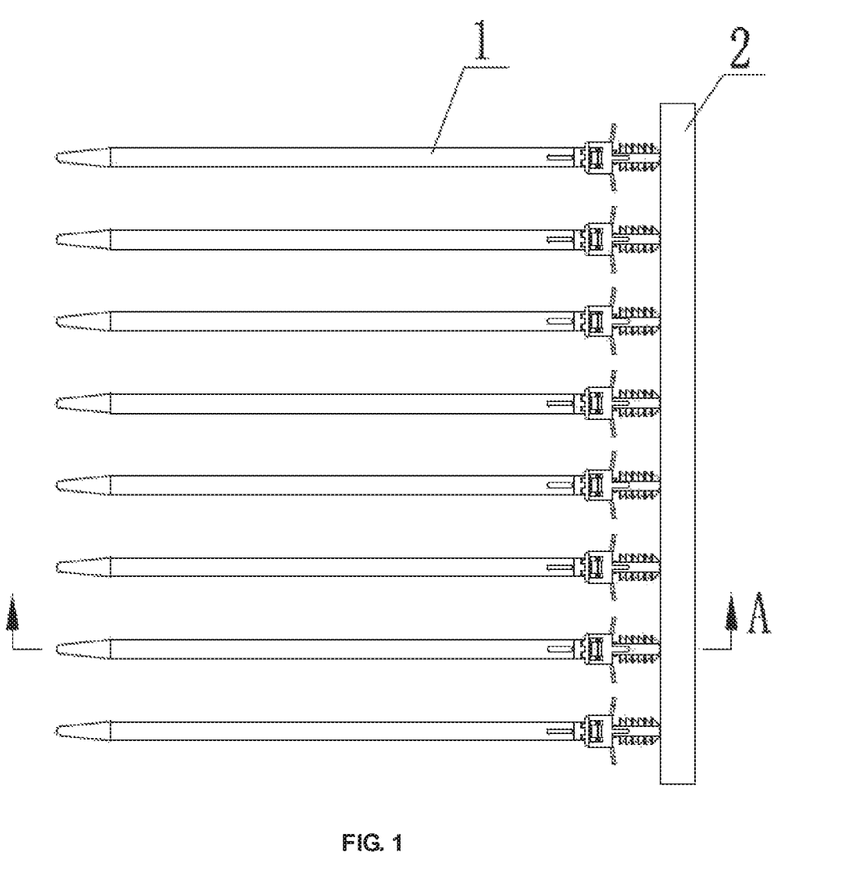
FIG. 1 is a front view of an interconnected tie assembly having one-piece fixing ties with fir-tree-shaped heads according to an embodiment of the present disclosure.
Figure 2:
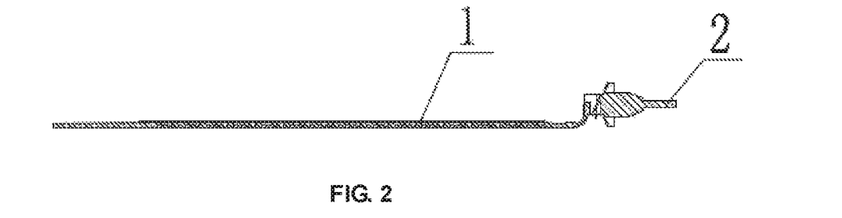
FIG. 2 is a sectional view taken along line A-A of FIG. 1.
Figure 3:
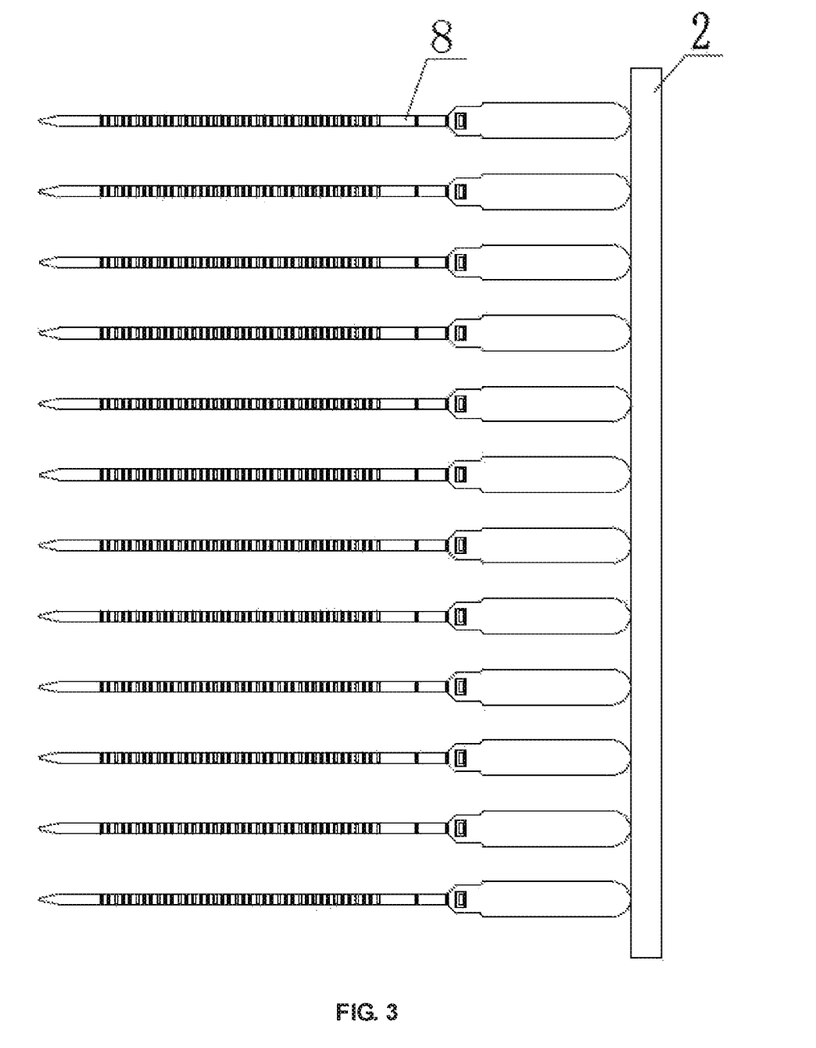
FIG. 3 is a front view of an interconnected tie assembly having labelled ties according to an embodiment of the present disclosure.
Figure 4:
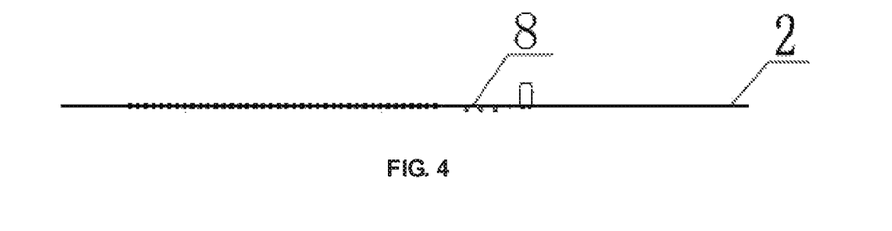
FIG. 4 is a bottom view of an interconnected tie assembly having labelled ties according to an embodiment of the present disclosure.
Figure 5:
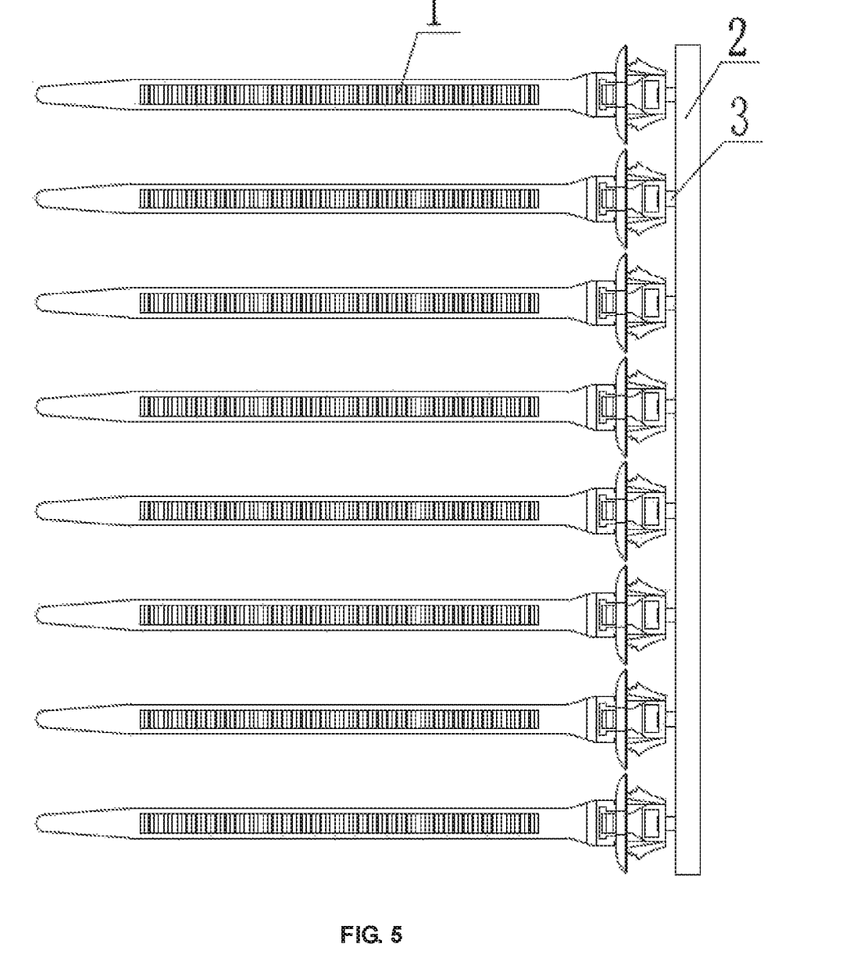
FIG. 5 is a front view of an interconnected tie assembly having runners according to an embodiment of the present disclosure.
Figure 6:
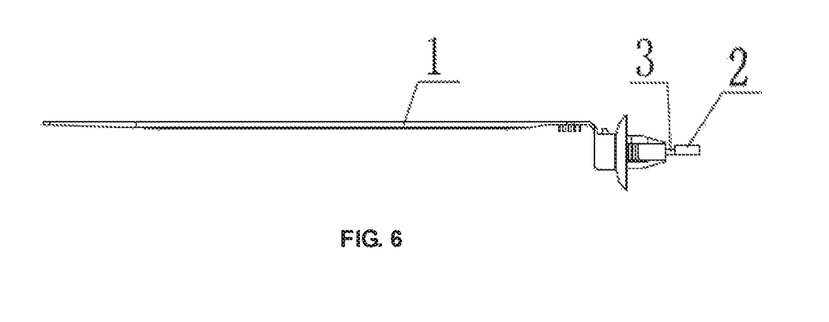
FIG. 6 is a bottom view of an interconnected tie assembly having runners according to an embodiment of the present disclosure.
Figure 7:
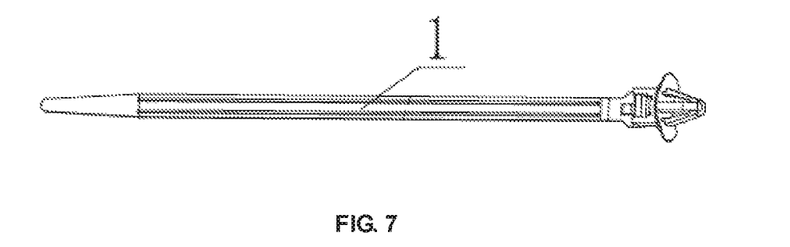
FIG. 7 is a front-side axonometric view of a form of a one-piece fixing tie in an interconnected tie assembly according to an embodiment of the present disclosure.
Figure 8:
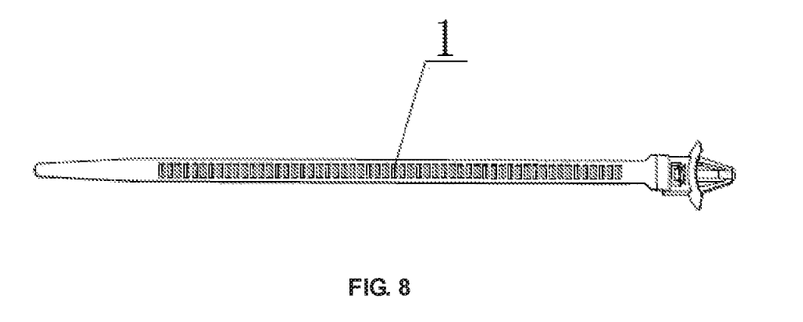
FIG. 8 is a back-side axonometric view of a form of a one-piece fixing tie in an interconnected tie assembly according to an embodiment of the present disclosure.
Figure 9:
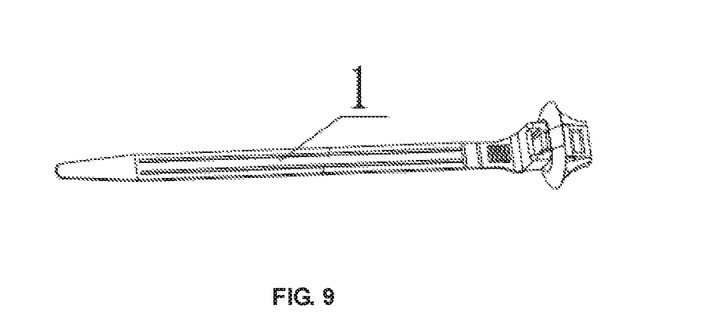
FIG. 9 is a front-side axonometric view of another form of a one-piece fixing tie in an interconnected tie assembly according to an embodiment of the present disclosure.
Figure 10:
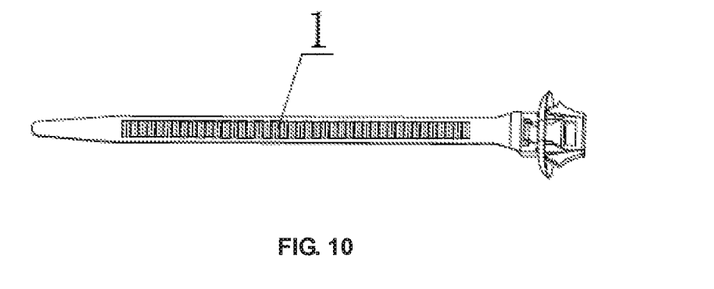
FIG. 10 is a back-side axonometric view of another form of a one-piece fixing tie in an interconnected tie assembly according to an embodiment of the present disclosure.
Figure 11:
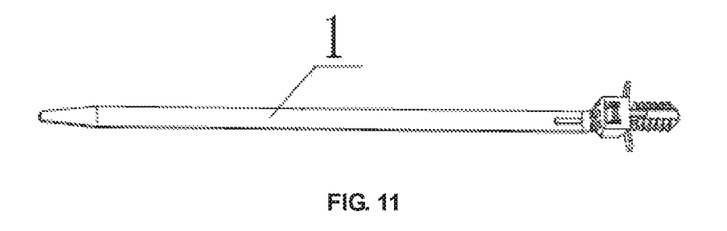
FIG. 11 is a front-side axonometric view of yet another form of a one-piece fixing tie in an interconnected tie assembly according to an embodiment of the present disclosure.
Figure 12:
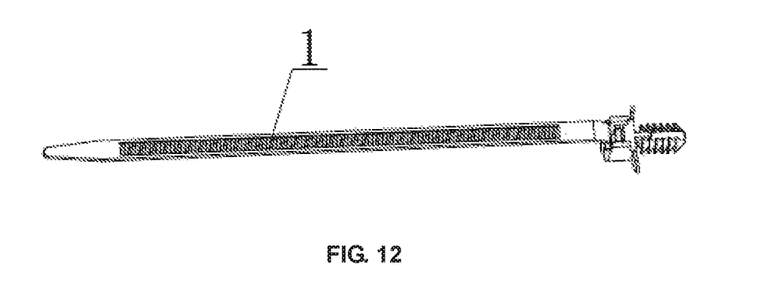
FIG. 12 is a back-side axonometric view of yet another form of a one-piece fixing tie in an interconnected tie assembly according to an embodiment of the present disclosure.
Figure 13:
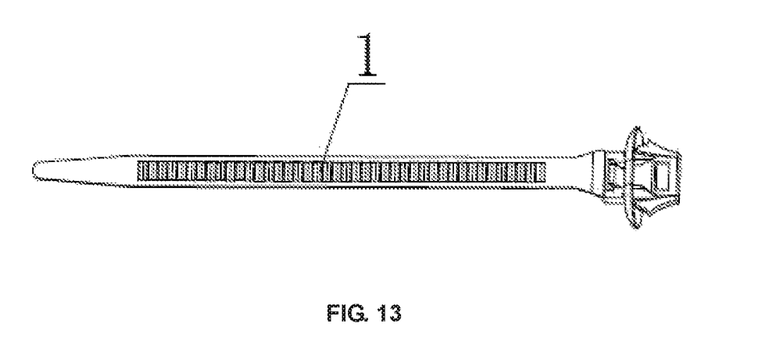
FIG. 13 is a front-side axonometric view of a labelled tie in an interconnected tie assembly according to an embodiment of the present disclosure.
Figure 14:
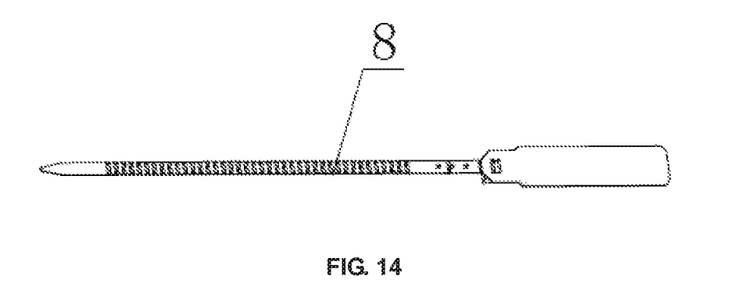
FIG. 14 is a back-side axonometric view of a labelled tie in an interconnected tie assembly according to an embodiment of the present disclosure.

Specifically, as shown in FIGS. 5 and 6, a runner 3 is correspondingly connected to the head of each of the one-piece fixing ties 1 or labelled ties 8, and the runner 3 is then connected to the main reinforcing plate 2. Flow channels are provided in the main reinforcing plate 2 and in the runners 3, respectively, and the flow channels of the runners 3 communicate with the flow channels of the main reinforcing plate 2. The main reinforcing plate 2 and the runners 3 not only serve to connect the plurality of one-piece fixing ties 1 or labelled ties 8 into one piece, but also the main reinforcing plate 2 and the runners 3 serve as flow channels for injection molding of the plurality of one-piece fixing ties 1 or labelled ties 8.

The combination of the main reinforcing plate 2 and the runners 3 with the injection molding process and injection mold technology not only reduces the amount of waste materials in the flow channels, but also reduces the workload because it is unnecessary to manually pull out the ties one by one from the flow channels for injection molding after the ties are molded.

Optionally, positioning members are provided at the two ends of the main reinforcing plate 2, respectively. Here, the positioning member may be in any suitable form, such as a positioning block, a positioning hole 4, a positioning slot, or the like. The positioning members can be used for positioning for facilitating end-to-end connection of a plurality of units of interconnected ties.

Optionally, the positioning member includes a positioning hole 4 and/or a positioning column 5, and the positioning hole 4 and/or the positioning column 5 is in a circular, elliptical, or polygonal shape; or the positioning member includes a positioning rib and/or a positioning slot.

Specifically, the positioning member may include a positioning hole 4, may include a positioning column 5, may include a positioning hole 4 and a positioning column 5, may include a positioning rib, may include a positioning slot, or may include a positioning rib and a positioning slot.

When the positioning member only includes a positioning hole 4, the positioning holes 4 are provided at the two ends of the main reinforcing plate 2, respectively. When it is necessary to connect a plurality of units of interconnected ties in an end-to-end manner, the positioning holes 4 are used as positioning marks for connection, so that the plurality of units of interconnected ties can be connected at a preset position(s), and the one-piece fixing ties 1 or the labelled ties 8 on the different units of interconnected ties are kept arranged at a fixed interval. A case where the positioning member only includes a positioning column 5, a positioning rib, or a positioning slot is the same as the case of only including the positioning hole 4, which will not be described in detail here.

Optionally, the positioning member includes a positioning hole 4 and a positioning column 5, the positioning hole 4 and the positioning column 5 are provided at the two ends of the main reinforcing plate 2, respectively, and the positioning hole 4 and the positioning column 5 can be connected to each other in cooperation; or the positioning member includes a positioning rib and a positioning slot, the positioning rib and the positioning slot are provided at the two ends of the main reinforcing plate 2, respectively, and the positioning rib and the positioning slot can be connected to each other in cooperation.

Figure 15:
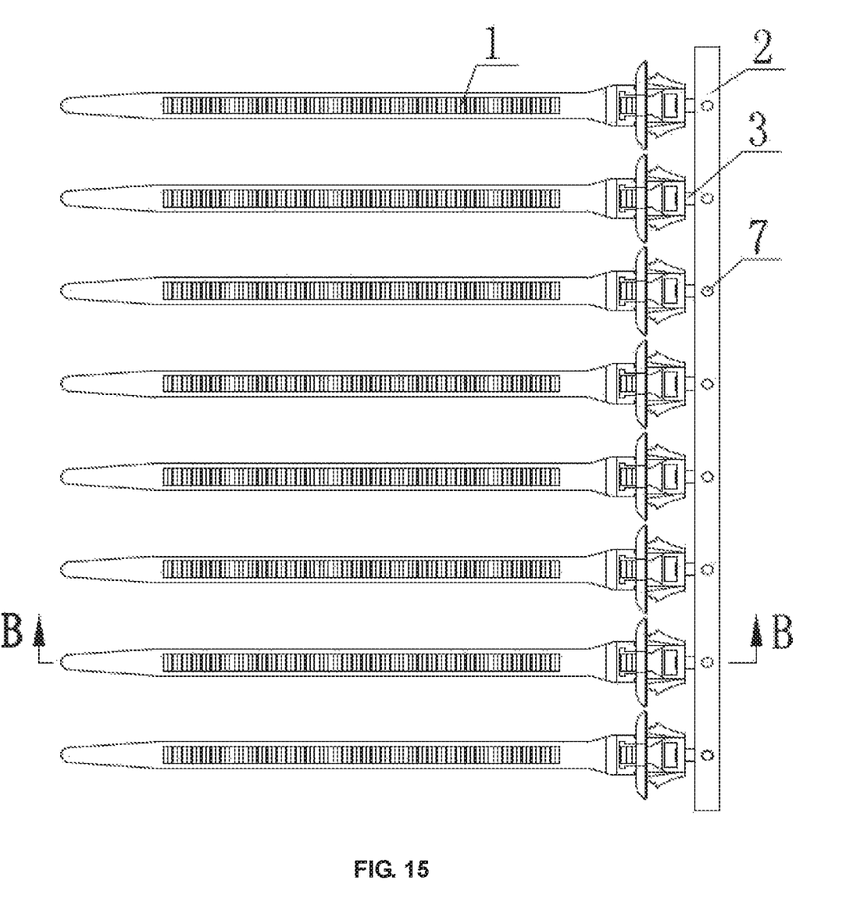
FIG. 15 is a front view of an interconnected tie assembly having interval positioning holes according to an embodiment of the present disclosure.
Figure 16:
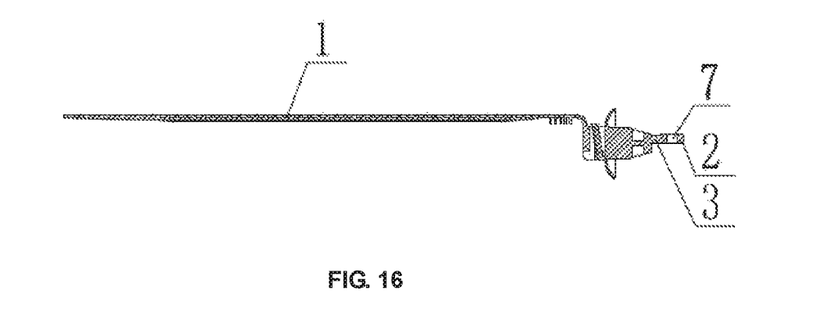
FIG. 16 is a sectional view taken along line B-B of FIG. 15.

As an embodiment, as shown in FIGS. 15 and 16, a positioning hole 4 and a positioning column 5 are provided at the two ends of the main reinforcing plate 2, respectively, and the positioning hole 4 and the positioning column 5 can be connected to each other in cooperation. In the end-to-end connection of a plurality of units of interconnected ties, the positioning column 5 of a previous unit of interconnected ties may be connected to the positioning hole 4 of the next unit of interconnected ties, so that they are used for positioning in the end-to-end connection of the plurality of units of interconnected ties. The positioning hole 4 and the positioning column 5 are each in a circular, or elliptical, or polygonal shape.

A case where the positioning member includes a positioning rib and a positioning slot is the same as the case where the positioning member includes the positioning hole 4 and the positioning column 5, which will not be described in detail here.

Optionally, the main reinforcing plate 2 is provided with interval positioning holes or interval positioning columns 7, and a distance between two adjacent interval positioning holes or interval positioning columns 7 is equal to the interval between two adjacent one-piece fixing ties 1 or labelled ties 8 in the unit of interconnected ties; or the distance between two adjacent interval positioning holes or interval positioning columns 7 is equal to n times or 1/n times the interval between two adjacent one-piece fixing ties 1 or labelled ties 8 in the unit of interconnected ties, where n is a positive integer.

Figure 17:
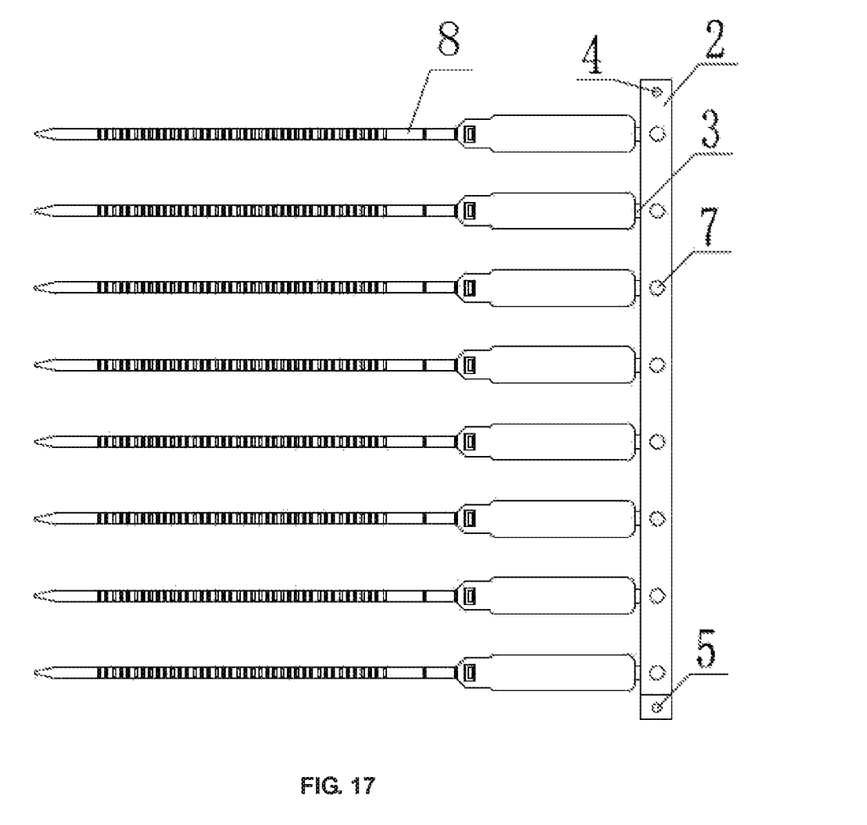
FIG. 17 is a front view of an interconnected tie assembly comprising a main reinforcing plate having a positioning hole and a positioning column at its two ends according to an embodiment of the present disclosure.
Figure 18:
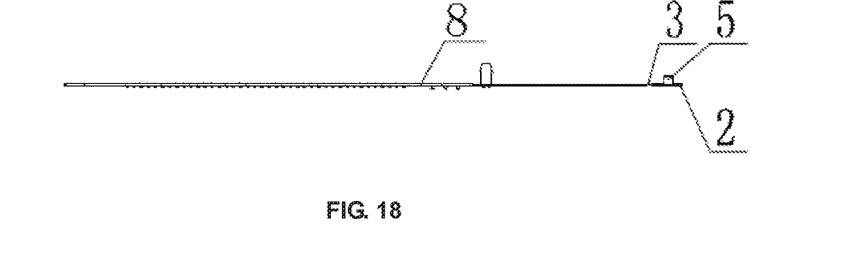
FIG. 18 is a bottom view of an interconnected tie assembly comprising a main reinforcing plate having a positioning hole and a positioning column at its two ends according to an embodiment of the present disclosure.
Figure 19:
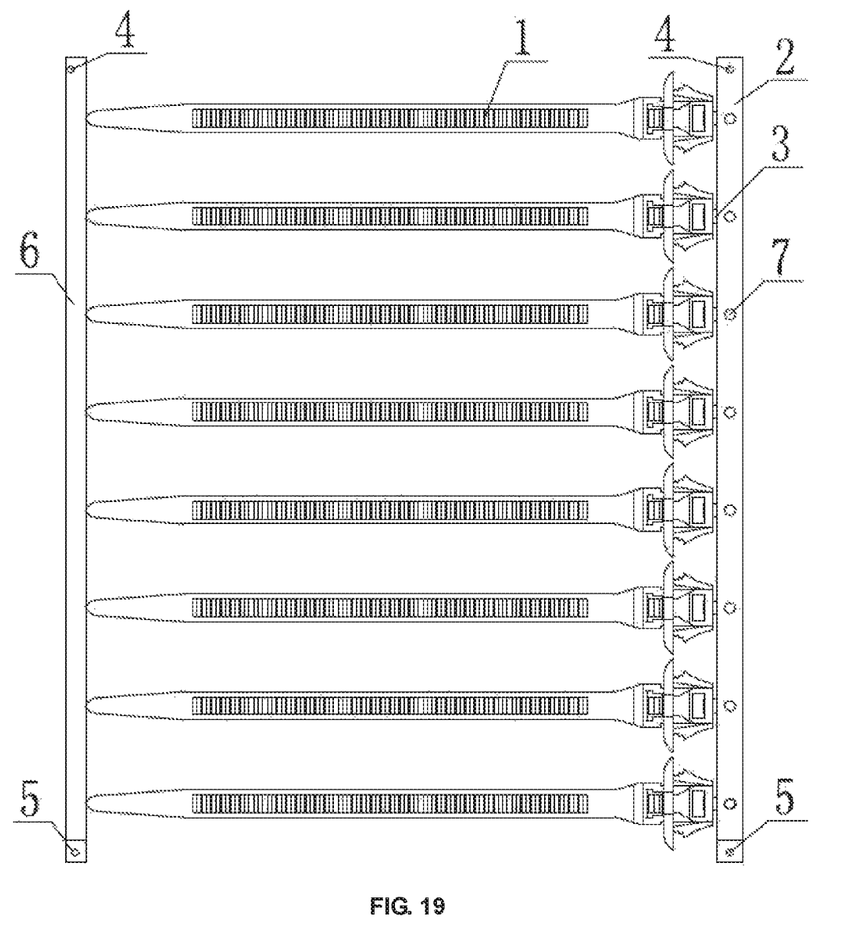
FIG. 19 is a front view of an interconnected tie assembly comprising an auxiliary reinforcing plate having a positioning hole and a positioning column at its two ends according to an embodiment of the present disclosure.
Figure 20:
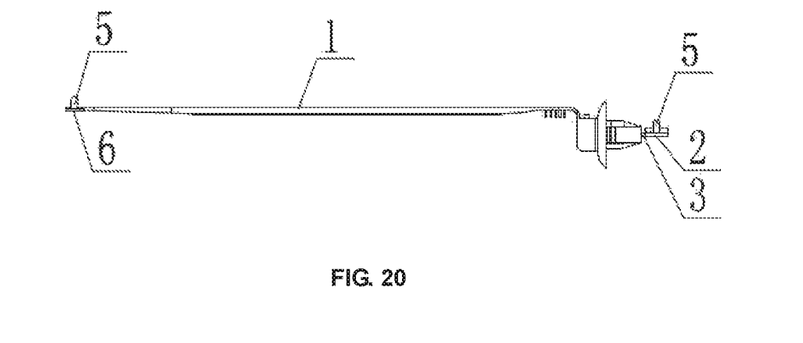
FIG. 20 is a bottom view of an interconnected tie assembly comprising an auxiliary reinforcing plate having a positioning hole and a positioning column at its two ends according to an embodiment of the present disclosure.
Figure 21:
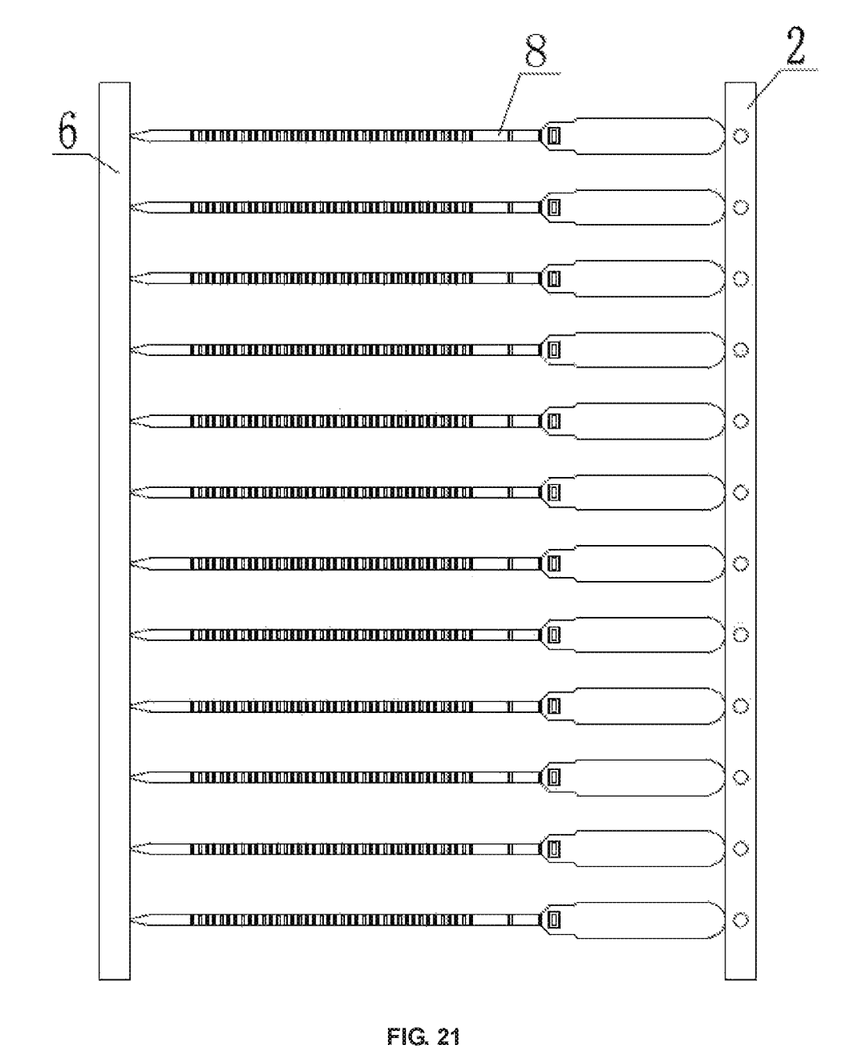
FIG. 21 is a front view of an interconnected tie assembly having labelled ties and an auxiliary reinforcing plate according to an embodiment of the present disclosure.

Specifically, as shown in FIGS. 17 and 18, interval positioning holes or interval positioning columns 7 are added to the main reinforcing plate 2, and the interval positioning holes or the interval positioning columns 7 are fitted to positioning columns 5 or positioning holes 4 provided on an automatic tying tool, and configured to position an interconnected tie assembly onto the automatic tying tool and used for allowing the automatic tying tool to drive an interconnected tie assembly. The interval positioning holes or interval positioning columns 7 are each in a circular, elliptical, or polygonal shape. The distance between two adjacent interval positioning holes or interval positioning columns 7 is equal to the interval between two adjacent one-piece fixing ties 1 or labelled ties 8 in the unit of interconnected ties, or the distance between two adjacent interval positioning holes or interval positioning columns 7 is equal to n times or 1/n times the interval between two adjacent one-piece fixing ties 1 or labelled ties 8 in the unit of interconnected ties, where n is a positive integer.

Optionally, the interconnected tie assembly further comprises an auxiliary reinforcing plate 6, the auxiliary reinforcing plate 6 is perpendicular to the length direction of each of the one-piece fixing ties 1 or labelled ties 8, and the auxiliary reinforcing plate 6 is connected to the end portion of each of the one-piece fixing ties 1 or labelled ties 8.

Specifically, as shown in FIGS. 19, 20, 21, 22, and 23, the auxiliary reinforcing plate 6 extends in a direction perpendicular to the length direction of each of the one-piece fixing ties 1 or the labelled ties 8, and the auxiliary reinforcing plate 6 is connected to the end portion of each of the one-piece fixing ties 1 or the labelled ties 8, either by means of adhesion or by a connector. The auxiliary reinforcing plate 6 and the one-piece fixing ties 1 or the labelled ties 8 may also made as a one-piece mechanism. The auxiliary reinforcing plate 6 can reduce the deformation of the end portion of each of the one-piece fixing ties 1 or the labelled ties 8.

Optionally, in addition to serving the function of connecting the one-piece fixing ties 1 or the labelled ties 8, the auxiliary reinforcing plate 6 can also be used for storing a cold material in the injection molding of the unit of interconnected ties, so as to reduce the chance of welding of the cold material onto the one-piece fixing ties 1 or the labelled ties 8. When the unit of interconnected ties is used in cooperation with an automatic tying apparatus or an automatic tying tool, the automatic tying apparatus or the automatic tying tool automatically cuts off the one-piece fixing ties 1 or labelled ties 8 individually and discharges the main reinforcing plate 2, the runners 3, and the auxiliary reinforcing plate 6 as waste.

Optionally, positioning members are provided at the two ends of the auxiliary reinforcing plate 6, respectively. Here, the positioning member may be in any suitable form, such as a positioning block, a positioning hole 4, a positioning slot, or the like. The positioning members can be used for positioning for facilitating end-to-end connection of a plurality of units of interconnected ties.

Optionally, the positioning member includes a positioning hole 4 and/or a positioning column 5, and the positioning hole 4 and/or the positioning column 5 is in a circular, elliptical, or polygonal shape.

Here, the positioning member may only include a positioning hole 4, or may only include a positioning column 5. When the positioning member only includes a positioning hole 4, the positioning holes 4 are provided at the two ends of the auxiliary reinforcing plate 6, respectively. When it is necessary to connect a plurality of units of interconnected ties in an end-to-end manner, the positioning holes 4 are used as positioning marks for connection, so that the plurality of units of interconnected ties can be connected at a preset position(s), and the one-piece fixing ties 1 or the labelled ties 8 on the different units of interconnected ties are kept arranged at a fixed interval. A case where the positioning member only includes a positioning column 5 is the same as the case of only including the positioning hole 4, which will not be described in detail here.

Optionally, the positioning member includes a positioning hole 4 and a positioning column 5, the positioning hole 4 and the positioning column 5 are provided at the two ends of the auxiliary reinforcing plate 6, respectively, and the positioning hole 4 and the positioning column 5 can be connected to each other in cooperation.

Specifically, as shown in FIGS. 19, 20, 22, and 23, a positioning hole 4 and a positioning column 5 are provided at the two ends of the auxiliary reinforcing plate 6, respectively, and the positioning hole 4 and the positioning column 5 can be connected to each other in cooperation. In the end-to-end connection of a plurality of units of interconnected ties, the positioning column 5 of a previous unit of interconnected ties may be connected to the positioning hole 4 of the next unit of interconnected ties, so that they are used for positioning in the end-to-end connection of the plurality of units of interconnected ties. The positioning hole 4 and the positioning column 5 are each in a circular, elliptical, or polygonal shape. Alternatively, a positioning rib and a positioning slot are respectively provided at the two ends of the auxiliary reinforcing plate 6 instead of the positioning hole 4 and the positioning column 5, so as to be used for positioning in the end-to-end connection of a plurality of units of interconnected ties.

Figure 22:
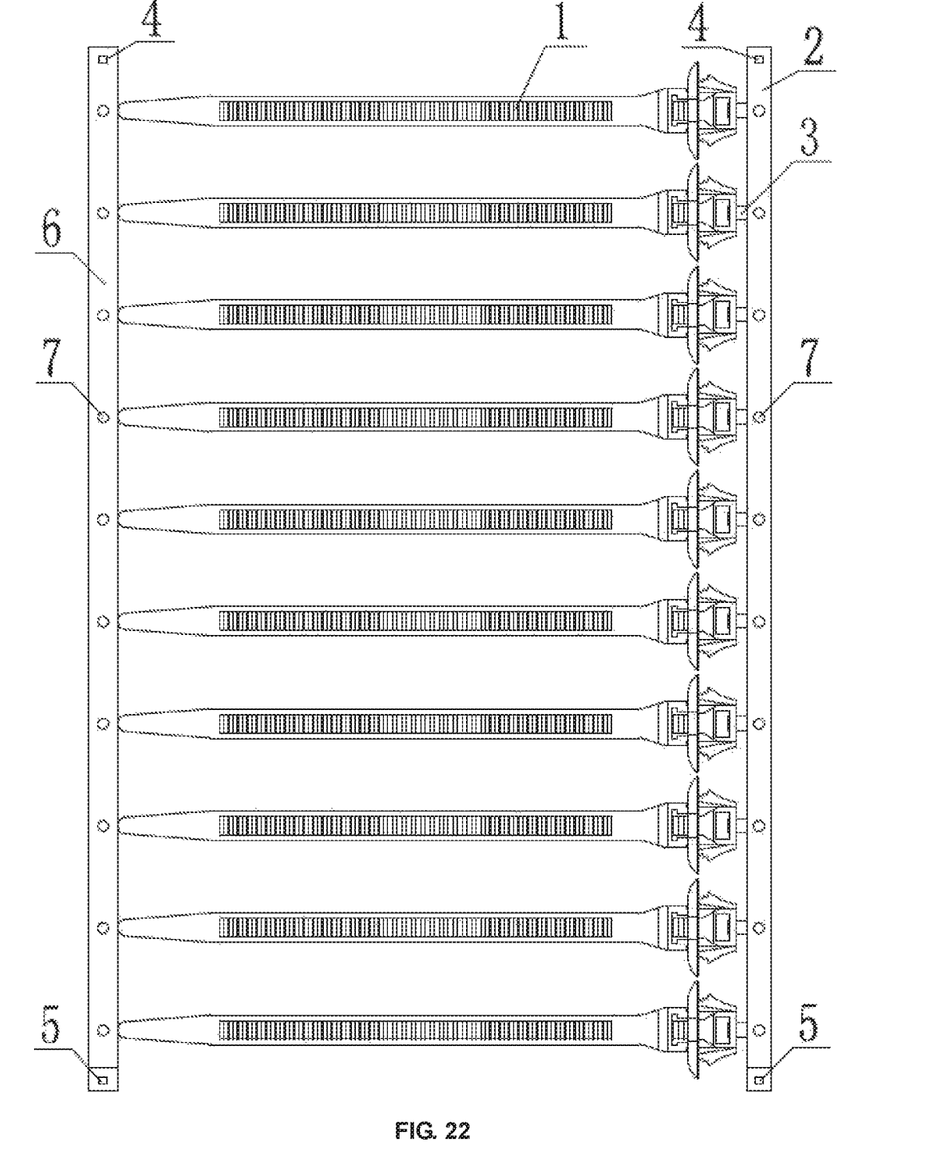
FIG. 22 is a front view of an interconnected tie assembly having a main reinforcing plate, a quadrangular positioning hole, and a quadrangular positioning column according to an embodiment of the present disclosure.

Optionally, as shown in FIG. 22, interval positioning holes or interval positioning columns 7 are added to the auxiliary reinforcing plate 6, and the interval positioning holes or the interval positioning columns 7 are fitted to positioning columns 5 or positioning holes 4 provided on an automatic tying tool, and used for positioning the interconnected tie assembly onto the automatic tying tool and used for allowing the automatic tying tool to drive the interconnected tie assembly. The interval positioning holes or interval positioning columns 7 are each in a circular, or elliptical, or polygonal shape. A distance between two adjacent interval positioning holes or interval positioning columns 7 is equal to the interval between two adjacent one-piece fixing ties 1 or labelled ties 8 in the unit of interconnected ties, or the distance between two adjacent interval positioning holes or interval positioning columns 7 is equal to n times or 1/n times the interval between two adjacent one-piece fixing ties 1 or labelled ties 8 in the unit of interconnected ties, where n is a positive integer.

Figure 23:
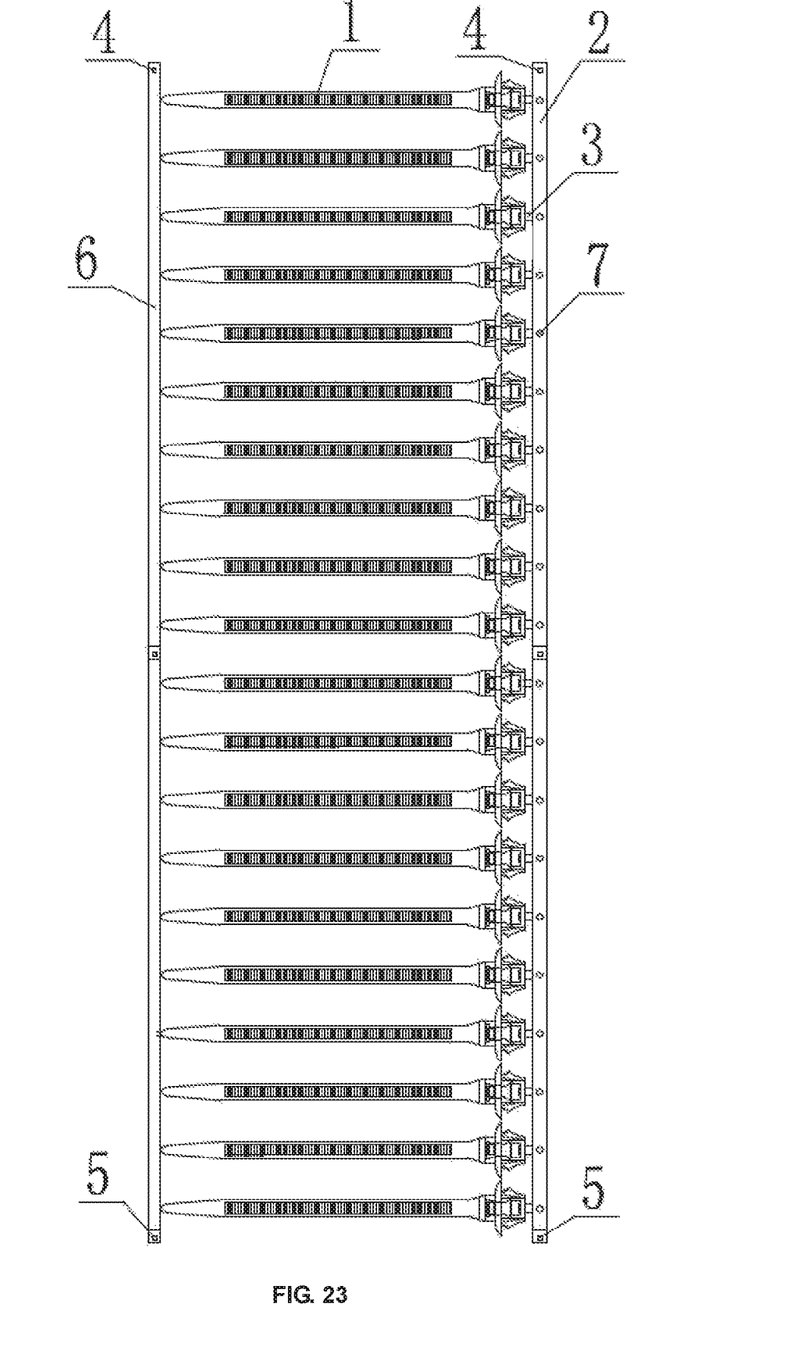
FIG. 23 is a front view of an interconnected tie assembly having two units of interconnected ties connected in an end-to-end manner according to an embodiment of the present disclosure.

Optionally, a plurality of units of interconnected ties are connected in an end-to-end manner to form a string or a roll. As shown in FIG. 23, two units of interconnected ties are connected in an end-to-end manner. Similarly, a plurality of units of interconnected ties are connected in an end-to-end manner to form a string or a roll.

This embodiment also provides a locking device, comprising the interconnected tie assembly described in this embodiment. A workpiece(s) can be locked to a preset position(s) by using an automatic tying apparatus and the interconnected tie assembly. Since the fixing head portion of at least one one-piece fixing tie 1 or the label edge of at least one labelled tie 8 is fixedly connected to one main reinforcing plate 2, deformation of the fixing head portion of the one-piece fixing tie 1 or of the label edge of the labelled tie 8 can be reduced, which provides a more reliable feeding mode for automatic tying operations. Moreover, since the fixing head portion of at least one one-piece fixing tie 1 or the label edge of at least one labelled tie 8 is connected integrally with one main reinforcing plate 2 to form a unit of interconnected ties, the interconnected tie assembly according to this embodiment is used without a vibratory bowl feeder and a material dispersing mechanism, so that an apparatus for automatic tying operation can be changed from the automatic tying apparatus to an automatic tying tool, and the apparatus can be made with a greatly reduced cost and size, and used more conveniently. In addition, compared with the prior art in which the loose-packed one-piece fixing ties 1 or the loose-packed labelled ties 8, which are injection-molded and then are pulled out one by one and then put into bags, are deformed while being pulled out, and have an increased chance of deformation when they are put into plastic bags in a loose-packed state, the interconnected one-piece fixing ties 1 or labelled ties 8 are much less deformed because they are present in an interconnected mode from the aspects including the mold structure, manufacturing process, packaging, and sale.

The above embodiments may be appropriately changed or modified, by those skilled in the art to which the present disclosure relates, based on the disclosure and teaching provided in the above description. Therefore, the present disclosure is not limited to the specific embodiments disclosed and described above, and some modifications and changes made to the present disclosure shall also fall within the protective scope of the claims of the present disclosure. In addition, although some particular terms are used in this specification, these terms are intended only for the convenience of description and are not intended to limit the present disclosure in any way.

INDUSTRIAL APPLICABILITY

The interconnected tie assembly according to the embodiments of the present disclosure, which is much less deformable, provides a more reliable feeding mode for automatic tying operations such that the apparatus can be made with a greatly reduced cost and size and used more conveniently, and the interconnected tie assembly is manufactured with a reduced amount of waste materials in the flow channels and with reduced workload.

What is claimed is:

1. An interconnected tie assembly, comprising:
a main reinforcing plate, and
one-piece fixing ties or labelled ties,
wherein the one-piece fixing ties or the labelled ties are arranged at a fixed interval, the main reinforcing plate is perpendicular to a length direction of each of the one-piece fixing ties or the labelled ties, and a fixing head portion of at least one of the one-piece fixing ties or a label edge of at least one of the labelled ties is connected integrally with one main reinforcing plate to form a unit of interconnected ties,
wherein the main reinforcing plate is provided with interval positioning holes or interval positioning columns, and
wherein a distance between two adjacent interval positioning holes or interval positioning columns is equal to an interval between two adjacent one-piece fixing ties or labelled ties in the unit of interconnected ties; or a distance between two adjacent interval positioning holes or interval positioning columns is equal to n times or 1/n times the interval between two adjacent one-piece fixing ties or labelled ties in the unit of interconnected ties, wherein n is a positive integer.

2. The interconnected tie assembly according to claim 1, wherein a plurality of one-piece fixing ties or labelled ties are provided, and fixing head portions of the plurality of one-piece fixing ties or label edges of the plurality of labelled ties are connected directly to one main reinforcing plate, respectively.

3. The interconnected tie assembly according to claim 1, wherein a runner is disposed between a head of each of the one-piece fixing ties or the labelled ties, and the main reinforcing plate.

4. The interconnected tie assembly according to claim 1, wherein a positioning member is provided at each of two ends of the main reinforcing plate, respectively.

5. The interconnected tie assembly according to claim 4, wherein:
each of the positioning members is a positioning hole or a positioning column, and the positioning hole and/or the positioning column is in a circular, elliptical, or polygonal shape.

6. The interconnected tie assembly according to claim 5, wherein:
one of the positioning members is the positioning hole and the other one is the positioning column, wherein the positioning hole and the positioning column are provided at the two ends of the main reinforcing plate, respectively, and the positioning hole and the positioning column are configured to be connected to each other in cooperation.

7. The interconnected tie assembly according to claim 1, wherein the interval positioning holes or the interval positioning columns are each in a circular, elliptical, or polygonal shape.

8. The interconnected tie assembly according to claim 1, wherein the interconnected tie assembly further comprises an auxiliary reinforcing plate, wherein the auxiliary reinforcing plate is perpendicular to the length direction of each of the one-piece fixing ties or the labelled ties, and the auxiliary reinforcing plate is connected to an end portion of each of the one-piece fixing ties or the labelled ties.

9. The interconnected tie assembly according to claim 8, wherein positioning members are provided at two ends of the auxiliary reinforcing plate, respectively.

10. The interconnected tie assembly according to claim 9, wherein each of the positioning members is a positioning hole or a positioning column, and the positioning hole and/or the positioning column is in a circular, elliptical, or polygonal shape.

11. The interconnected tie assembly according to claim 10, wherein one of the positioning members is the positioning hole and the other one is the positioning column, wherein the positioning hole and the positioning column are provided at the two ends of the auxiliary reinforcing plate, respectively, and the positioning hole and the positioning column are configured to be in connected to each other in cooperation.

12. The interconnected tie assembly according to claim 8, wherein the auxiliary reinforcing plate is provided with interval positioning holes or interval positioning columns, and a distance between two adjacent interval positioning holes or interval positioning columns is equal to the interval between two adjacent one-piece fixing ties or labelled ties in the unit of interconnected ties, or a distance between two adjacent interval positioning holes or interval positioning columns is equal to n times or 1/n times the interval between two adjacent one-piece fixing ties or labelled ties in the unit of interconnected ties, wherein n is a positive integer.

13. The interconnected tie assembly according to claim 12, wherein the interval positioning holes or the interval positioning columns on the auxiliary reinforcing plate are each in a circular, elliptical, or polygonal shape.

14. The interconnected tie assembly according to claim 1, wherein a plurality of units of interconnected ties are connected in an end-to-end manner to form a string or a roll.

15. The interconnected tie assembly according to claim 2, wherein a runner is disposed between a head of each of the one-piece fixing ties or the labelled ties, and the main reinforcing plate.

16. The interconnected tie assembly according to claim 2, wherein a positioning member is provided at each of two ends of the main reinforcing plate, respectively.

17. The interconnected tie assembly according to claim 3, wherein a positioning member is provided at each of two ends of the main reinforcing plate, respectively.

* * * * *